US009482592B2

(12) United States Patent
Huseynov et al.

(10) Patent No.: US 9,482,592 B2
(45) Date of Patent: Nov. 1, 2016

(54) DIRECTIONAL ULTRASONIC GAS LEAK DETECTOR

(71) Applicant: General Monitors, Inc., Lake Forest, CA (US)

(72) Inventors: Javid J. Huseynov, Fountain Valley, CA (US); Shankar B. Baliga, Irvine, CA (US); John G. Romero, Rancho Santa Margarita, CA (US)

(73) Assignee: General Monitors, Inc., Lake Forest, CA (US)

( * ) Notice: Subject to any disclaimer, the term of this patent is extended or adjusted under 35 U.S.C. 154(b) by 213 days.

(21) Appl. No.: 14/495,739

(22) Filed: Sep. 24, 2014

(65) Prior Publication Data

US 2016/0084729 A1    Mar. 24, 2016

(51) Int. Cl.
  *G01M 3/24*       (2006.01)
  *G01S 3/808*      (2006.01)

(52) U.S. Cl.
  CPC .............. *G01M 3/24* (2013.01); *G01S 3/808* (2013.01)

(58) Field of Classification Search
  CPC ........ G01M 3/24; G01S 3/808; H04R 1/083; H04R 3/005; H04R 1/028
  See application file for complete search history.

(56) References Cited

U.S. PATENT DOCUMENTS

| 3,895,340 A | 7/1975 | Gilmour | |
| 6,600,824 B1* | 7/2003 | Matsuo | H04R 3/005 381/122 |
| 7,817,805 B1* | 10/2010 | Griffin | G01S 3/807 367/103 |
| 8,638,362 B1 | 1/2014 | Thompson et al. | |
| 2006/0125348 A1* | 6/2006 | Smith | H02N 1/006 310/309 |
| 2008/0240463 A1* | 10/2008 | Florencio | H04R 3/005 381/92 |
| 2009/0060246 A1 | 3/2009 | Baliga et al. | |
| 2014/0000347 A1 | 1/2014 | Huseynov et al. | |
| 2014/0241548 A1 | 8/2014 | Kim et al. | |

FOREIGN PATENT DOCUMENTS

| CN | 102539084 A | 7/2012 |
| WO | 2010007435 A2 | 1/2010 |

OTHER PUBLICATIONS

Huseynov, Javid, et al., Gas-Leak Localization Using Distributed Ultrasonic Sensors, Smart Sensor Phenomena, Technology, Networks, and Systems 2009, edited by Norbert G. Meyendorf, Kara J. Peters, Wolfgang Ecke, Proc. of SPIE vol. 7293, 72930Z-1.

(Continued)

*Primary Examiner* — Francis Gray
(74) *Attorney, Agent, or Firm* — Larry K. Roberts (57) ABSTRACT

An embodiment of a directional ultrasonic gas leak detector includes an array of spaced MEMS microphones, each responsive to incident airborne ultrasonic energy from gas leak sources to generate a microphone signal. A beamforming processor is responsive to the microphone signals from the array to generate processor output signals indicative of estimated angles of arrival of ultrasonic energy incident on the array. The array may be disposed in an explosion proof housing structure for operation in hazardous location, or implemented as an intrinsically safe device. In another embodiment, a display is responsive to the processor output signals to generate an image representative of a surveilled scene with the estimated magnitudes of incident energy at beam directions overlaid onto the image.

21 Claims, 11 Drawing Sheets

(56) References Cited

OTHER PUBLICATIONS

Huseynov, Javid, Distributed Localization of Ultrasonic Sources of Gas Leak, Dissertation, University of California, Irvine, 2008.
Naranjo, et al., "Expanding the Use of Ultrasonic Gas Leak Detectors: A Review of Gas Release Characteristics for Adequate Detection," Gases & Instrumentation, Nov./Dec. 2009, pp. 24-29.
Product Data for NORSONIC, Acoustic Camera Nor848A, date unknown.
International Search Report and Written Opinion of the International Searching Authority, re PCT Application PCT/US2015/050127; mailed Mar. 8, 2016.
Ward D B et al: "Mixed nearfield/farfield beamforming: a new technique for speech acquisition in a reverberant environment", Applications of Signal Processing to Audio and Acoustics, 1997. 1997 IEEE ASSP Workshop on New Paltz, NY, USA Oct. 19-22, 1997, New York, NY, USA, IEEE, US, Oct. 19, 1997.
Edward Naranjo: "Standards Certification Education & Training Publishing Conferences & Exhibits Fixed Ultrasonic Gas Leak Detection", Instrumentation 2013 EXPO, Mar. 15, 2013 (Mar. 15, 2013), pp. 1-31, XP055236535.
Holland Stephen D et al: "An ultrasonic array sensor for spacecraft leak direction finding", Ultrasonics, vol. 45, No. 1, 2006, pp. 121-126, XP029240679.

* cited by examiner

DIRECTIONAL ULTRASONIC GAS LEAK DETECTOR

BACKGROUND

Ultrasonic gas leak detectors measure the sound pressure waves generated by turbulent flow when gas escapes from higher pressures to the ambient atmosphere. Such gas leak detectors are used as industrial safety devices to monitor the unwanted or unexpected release of combustible or toxic gases into the atmosphere. The leaks need to be identified quickly before they grow further in magnitude, to allow for timely remedial action. Ultrasonic gas leak detectors have the advantage over other gas detector types in that gas does not need to reach the detector; gas leaks can be detected even if the leaking gas is dispersed by wind.

Conventional ultrasonic gas leak detectors are omnidirectional and while providing useful information about the size and duration of a pressurized gas leak do not provide any information to maintenance personnel about the location of the gas leak. Conventional open path detectors, which are line of sight optical detectors, also do not provide leak location information. Conventional point detectors, such as catalytic, infrared or electrochemical, need to be placed in close proximity to each other at added expense to provide for more precise leak location information. Infrared gas cloud imaging cameras are expensive, their sensitivity varies greatly with the gas being monitored, and their performance depends greatly on the differential between the leaking gas cloud and background temperature. For such reasons infrared gas cloud imaging cameras are not being readily adopted in industrial fixed gas detection installations. A need therefore exists to add the benefits of leak location or, at a minimum, leak direction to ultrasonic gas leak detection equipment.

SUMMARY

An embodiment of a directional ultrasonic gas leak detector includes an array of spaced MEMS microphones, each responsive to incident airborne ultrasonic energy from gas leak sources to generate a microphone signal. A beamforming processor is responsive to the microphone signals from the array to generate processor output signals indicative of estimated angles of arrival of ultrasonic energy incident on the array. The array may be disposed in an explosion proof housing structure for operation in hazardous location, or implemented as an intrinsically safe device. In another embodiment, a display is responsive to the processor output signals to generate an image representative of a surveilled scene with the estimated magnitudes of incident energy at beam directions overlaid onto the image.

BRIEF DESCRIPTION OF THE DRAWINGS

Features and advantages of the disclosure will readily be appreciated by persons skilled in the art from the following detailed description when read in conjunction with the drawing wherein.

DETAILED DESCRIPTION

In the following detailed description and in the several figures of the drawing, like elements are identified with like reference numerals. The figures are not to scale, and relative feature sizes may be exaggerated for illustrative purposes.

Ultrasonic gas leak detectors on the market may utilize a single pre-polarized pressure microphone, such as manufactured by G.R.A.S. Sound and Vibration of Nolte, Denmark, Microtech Gefell GmbH of Gefell, Germany, or Bruel Kjaer of Naerum, Denmark. The ultrasonic region is defined as a frequency range beyond human hearing, starting at approximately 20 kHz in healthy, young human adults. Higher ultrasonic frequencies are attenuated more rapidly in air than lower frequencies, and the practical applications for an ultrasonic gas leak detection system are typically for frequencies less than 100 kHz.

In an exemplary embodiment, a directional ultrasonic gas leak detector includes an array of spaced microphones. Each microphone is responsive to incident airborne broadband ultrasonic energy from gas leaks sources disposed within range of the array to generate a microphone signal. A beamforming processor is responsive to the microphone signals from the array to generate processor output signals indicative of estimated angles of arrival of ultrasonic energy incident on the array, from gas leak sources disposed within range of the array, e.g. within 30 meters to 50 meters from the array. The array may be housed in an explosion proof housing structure, or the detector may be designed to be an intrinsically safe device, to meet the requirements for operation in a hazardous location as defined by governing agency bodies. A hazardous location, in this context, is an area that contains or is likely to contain an ignitable concentration of flammable gas, vapor, or dust. The microphones are preferably spaced from adjacent microphones in the array by a spacing distance no larger than 5 mm.

In an exemplary embodiment, the ultrasonic microphone utilized in the array may be a miniature microphone based on MEMS (Micro Electro Mechanical Systems) technology that can be operated well beyond the audible range of 15 kHz and into the ultrasonic frequency range out to 100 kHz. The MEMS microphones may be mounted on a printed circuit board (PCB) and housed in an environmentally robust mechanical enclosure approved for use in hazardous locations, which permits passage of ultrasonic sound energy to the sensing element. U.S. Publications 2009/0060246 A1 and 2014/0000347 A1 detail the implementation of such MEMS microphones in industrial ultrasonic gas leak detectors, and the entire contents of these patent publications are incorporated herein by this reference.

Figure 1:
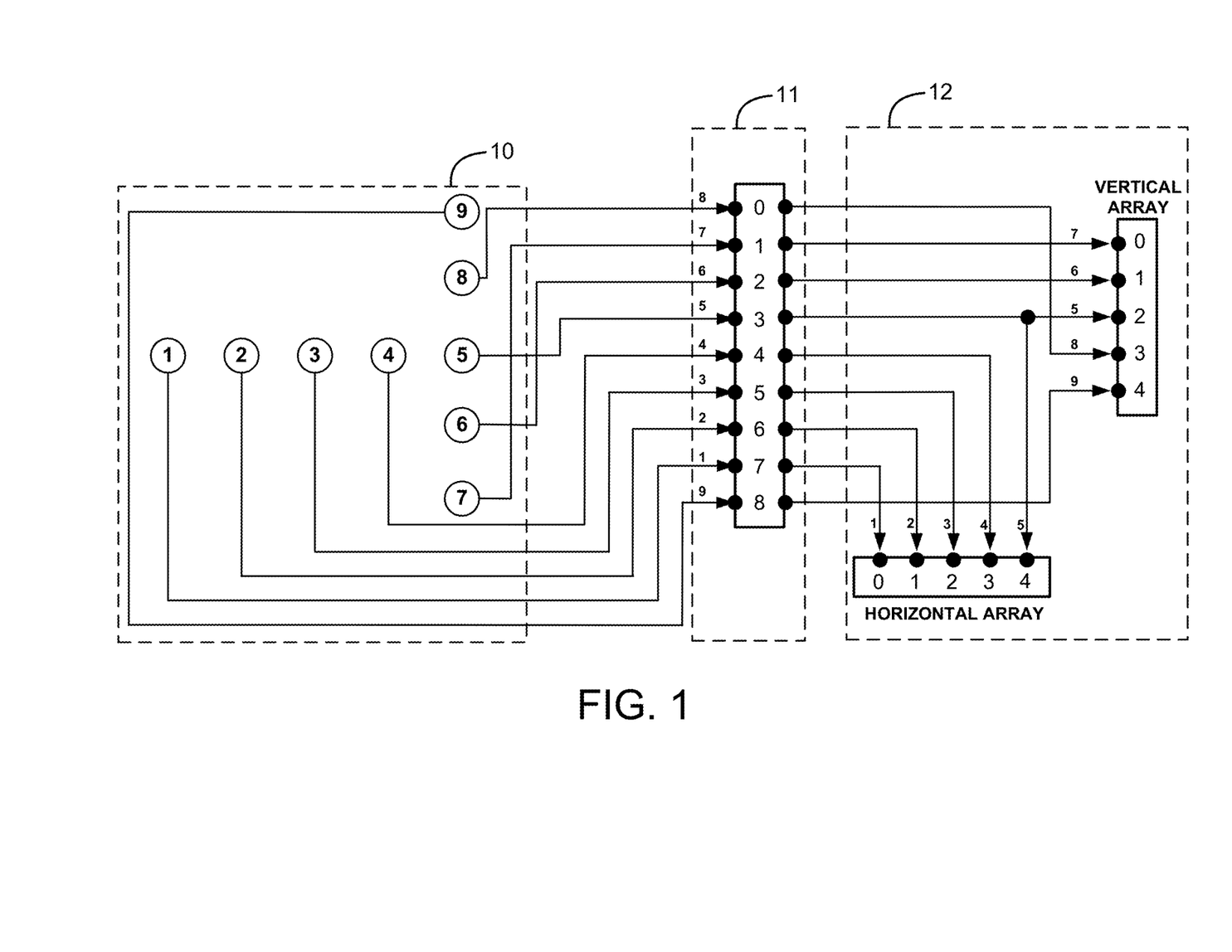
FIG. 1 is a schematic block diagram of an exemplary embodiment of a 2-dimensional array of MEMS microphones and associated electronics.

Discrete, pre-polarized stainless steel ultrasonic microphones provide for excellent ultrasonic performance but are much too large and expensive to be packaged into arrays for an industrial gas leak detector. MEMS microphones are miniature in comparison and lend themselves to be placed on a circuit board to form microphone arrays. In an exemplary embodiment, a 2-dimensional array of a total of nine MEMS microphones (1-9) is spaced uniformly and equally in two sets of five linear arrays intersecting and in perpendicular directions on a circuit board 10 (FIG. 1). In order to achieve uniform and equal spacing in both perpendicular directions, the array is positioned in the shape of a "T": this is dictated by the MEMS microphone package being rectangular rather than square or circular. In an exemplary embodiment for ultrasonic detection of gas leaks, the microphone array area on the circuit board will typically not exceed 10 square cm. The signals generated by the microphones are digitized by ADC 11 and processed by a processor with embedded software, generally indicated as 12. For microphones that produce a digital output, the processor may process such digital signals without the need for ADC 11.

Figure 2:
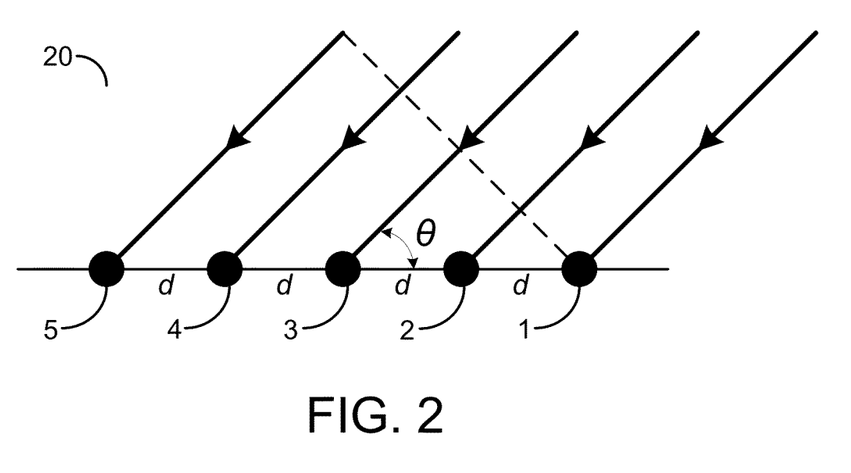
FIG. 2 is an illustration of a linear array of MEMS microphones with sound incident at an angle θ to the microphone array axis.

In an exemplary embodiment, N omnidirectional MEMS microphones are uniformly spaced in a line where N is at least 2. FIG. 2 is an illustration of a linear array 20 of five MEMS microphones (1, 2, 3, 4, and 5) with inter-microphone spacing d and with sound incident at an angle θ to the microphone array axis. Beamforming is a signal processing technique used in sensor arrays for directional signal transmission or reception, the latter being the case with microphones. A few of the rules that apply to beamforming with a uniform linear array (ULA) are:

a) An increase in the number of microphones can enhance the signal to noise ratio of an array, defined as array gain, and under conditions of coherent signal and incoherent noise given in (dB) by 10 log(N) where N is the number of microphones. Array gain can help with increased detection distance. Increasing N also results in a physically larger array.

b) Increasing the overall array length D with a larger number of microphones improves the spatial resolution. D is known as the aperture size, and in the case in which N microphones are equally spaced by a distance d, D=(N−1)d. For the broadside direction, the half power beamwidth is proportional to λ/D, where λ is the wavelength of the incident energy, and hence, a function of wavelength.

c) The inter-microphone microphone spacing d determines the highest frequency $f_{max}$ that can be steered without effects of aliasing. The acoustic wavelength for the highest frequency $f_{max}$ is the shortest wavelength $\lambda_{min}$, and microphone spacing d must satisfy the criteria $d<\lambda_{min}/2$ to prevent spatial aliasing. For a speed of sound in air of 340 m/sec and microphone spacing d=3.4 mm, $\lambda_{min}$ is 6.8 mm and $f_{max}$=50 kHz; such a beamformer can be used for ultrasonic frequencies below 50 kHz without the aliasing effects that result in copies of the main lobe of the directivity pattern. For MEMS microphones with dimensions in the neighborhood of 3 mm, the minimum inter-microphone spacing possible is also in the neighborhood of 3 mm resulting in an $f_{max}$ value around 50 kHz.

d) The atmospheric attenuation of ultrasound is a function of frequency and increases from about 1 dB/m at 40 kHz to about 10 dB/m at 170 kHz. Therefore, in practice, ultrasonic gas leak detector designs are restricted to frequencies below about 75 kHz; the same frequency limit would apply to beamforming due to atmospheric attenuation, further restricted to 50 kHz due to the aforementioned practical limits on inter-microphone spacing. Ultrasonic gas leak detectors also have a range of at most a few tens of meters for gas leaks for industry standard leak rates of order of 0.1 kg/sec.

FIG. 2 is an illustration of a linear array 20 of five MEMS microphones (1, 2, 3, 4, and 5) with inter-microphone spacing d and with sound incident at an angle θ to the microphone array axis. The MEMS microphone 1 rightmost in the figure receives the sound earlier than the MEMS microphone 2 to its left; the difference is known as time difference of arrival (TDOA). In the far field approximation, the sound source is far away compared to the microphone spacing and wavelength of the sound. Such approximation is valid in the case of a gas leak several meters away. The sound wave front received over the extent of the array in the far field may be considered planar rather than spherical; for a planar wavefront the difference in the time δt for receipt of sound between successive microphones is $$\delta t = (d * \cos \theta)/v \qquad (1)$$

where v is the speed of sound in air, typically 340 m/sec. In the frequency domain, the delay results in a phase shift between the signals received by the microphones. The delays are directly related to the incident angle and the geometry of the microphone array. Given the geometry of the microphone array, the delays or phase differences can be used to estimate the incident angle of arrival of the incident energy.

A technique known as Delay-and-Sum Beamforming may be used to estimate the incident angle θ. If a time delay is added to the recorded signal from each microphone that is equal and opposite of the delay caused by the extra travel time, it will result in signals that are perfectly in-phase with each other. Summing these in-phase signals will result in constructive interference that will amplify the result by the number of microphones in the array and result in a main lobe in the directivity pattern. This is known as time-delay-and-sum beamforming. For DOA (direction of arrival) estimation, also known as AOA (angle of arrival), one can iteratively test time delays for all possible directions. If the guess is wrong, the signal will destructively interfere, resulting in a diminished output signal, while the correct guess will result in the signal amplification described above. In practice, the time delay is continuously swept resulting in beamsteering from an initial angle (0 degrees typically) to a final angle (180 degrees typically). The angle of steering is obtained by inverting Equation 1 to get $$\theta = \cos^{-1}(\delta t * v/d) \qquad (2)$$

In an exemplary embodiment, the steering angle is increased in steps of 2.5 degrees in 72 steps providing for 180 degrees of beamsteering. This beamsteering is performed independently for each of the two perpendicular ULAs of FIG. 1. The azimuthal and elevation (φ, Θ) angular coordinates generated by the two perpendicular ULAs referenced to the axis perpendicular to the planar array result in a cone of sound sweep. In an exemplary embodiment, at each step angle, the signals from each MEMS microphone in the array of FIG. 1 are sampled at 150 kHz for n data samples where n may be 256.

Figure 3:
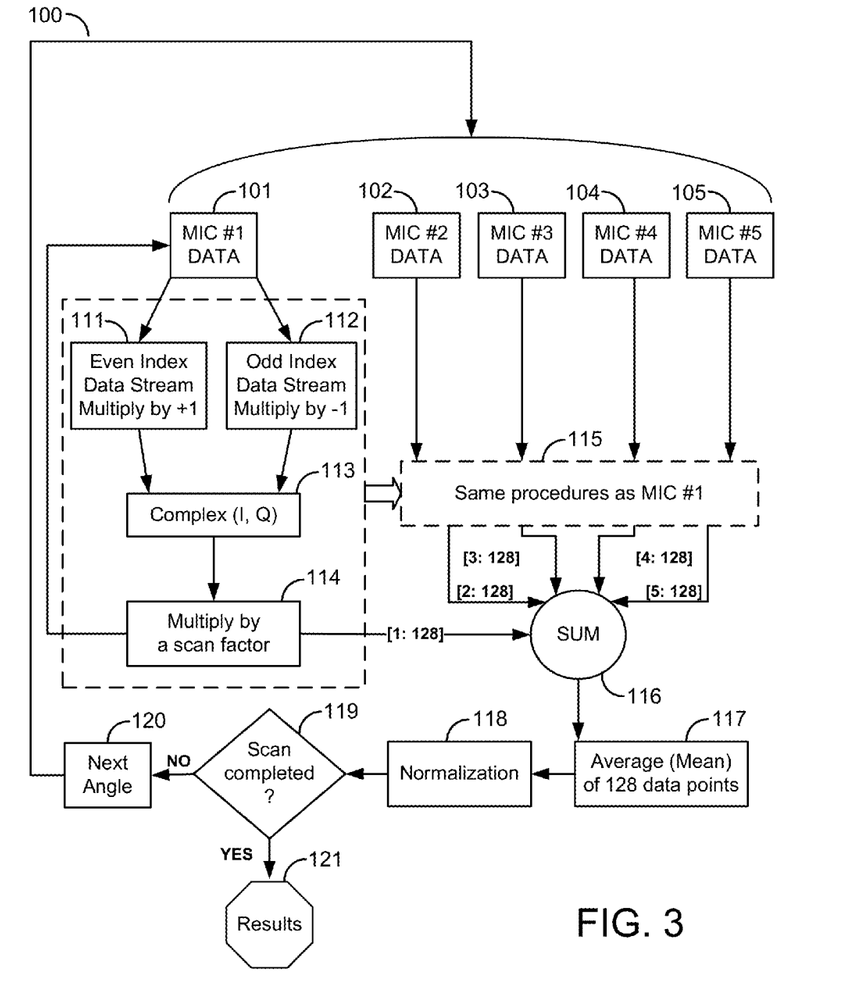
FIG. 3 is an exemplary embodiment of a software algorithm used in time-delay-and-sum beamforming for an ultrasonic microphone array.

FIG. 3 shows an exemplary embodiment of a functional software implementation of time-delay-and sum beamforming. Signals (101-105) from the MEMS microphones are sampled for n data samples where n may be 256 at the sampling rate of 150 kHz; five microphones are shown here as in the FIG. 1 and FIG. 2 ULAs, but for beamforming the ULA could have any number of microphones greater than a minimum of two. The sampled data stream is split into even and odd values by multiplying by even 111 or odd numbers 112. The even (I in-phase) and odd (Q out of phase or quadrature) data are combined in 113 to create a complex number that is easier for subsequent software processing to generate the peak amplitude corresponding to constructive interference along the direction of arrival (DOA). This in-phase and quadrature technique is well known in digital signal processing. The complex number generated at 113 is multiplied by the scan factor 114, which is a complex number comprised of the cosine and sine of the steering angle θ (Eq. 2).

$$\text{scan factor } (n) = \text{complex}(\cos(\theta_n), (\sin(\theta_n)) \quad (3)$$

where n is the steering angle direction between 0 and 180 degrees, for example, in 72 steps.

The data from each of the other MEMS microphones is processed similarly 115 and the processed signals from all MEMS microphones summed 116. The summed data 116 is averaged 117 and normalized 118 to the maximum value computed over all scan angles. The process is continued 119 for each scan angle 120 from 0 to 180 degrees. The maximum normalized value direction obtained over all steering angles is the DOA of the ultrasound.

The computation described in FIG. 3 is performed continuously, and for the parameters described above (150 kHz sampling rate, 256 data samples per step, 72 steps), the time for a complete 0 to 180 degree scan is about 0.1 second in one exemplary embodiment. Using the beamforming parameters described above, the time-delay-and-sum beamformer is thus able to generate a DOA plot 121 once every tenth of a second. The beamforming plot may be averaged over ten scans giving a response time of about a second. It should be noted that if there is more than one source of ultrasound the beamforming plot may indicate more than one DOA vector; the user is provided the relative strength of the local maxima peaks in the entire beamforming scan enabling action to be taken accordingly. The magnitude of the main lobe peak in a beamforming scan is indicative of the strength of the ultrasonic source. A single planar microphone array computes the direction of arrival but not the distance to the ultrasound source; consequently, a strong ultrasound source far away may generate the same SPL and main lobe peak size as a weaker ultrasound source nearer to the microphone array.

In an exemplary embodiment, the DOA is meaningful only if the ultrasound SPL is above a specified threshold, for example, 65 dB may be used as a threshold below which a warning may be generated but not an alarm.

For the exemplary 2-dimensional array such as shown in FIG. 1, the DOA computation is performed independently for each ULA, providing two independent angles (ϕ, Θ) that provide for the azimuth and elevation direction of the pressurized gas leak relative to the axis perpendicular to the planar microphone array. In the far field approximation where the gas leak source to be detected is several meters away, the fact that the MEMS microphone array of FIG. 1 is in the shape of a "T" does not cause any significant error over a more natural and centered MEMS microphone array in the form of an "+" where the intersection of the two linear arrays is the origin of the coordinate system.

FIG. 3 is a flow diagram illustrating an exemplary embodiment of time-delay-and-sum beamforming for a directional gas leak detector. Other beamforming techniques are available and known to those skilled in the art. These beamforming techniques include several types of frequency or spectrum based beamforming that are detailed in the references and may be considered to be within the scope and spirit of the invention. Whereas the planar array embodied in FIG. 1 is made up of two perpendicular linear arrays, beamforming can also be performed with square, rectangular, or circular arrays on planar or contoured surfaces, with larger number of analog or digital MEMS microphones at the expense of additional electronic circuitry, mathematically complex beamforming algorithms, and increased onboard computational power and memory. Various modifications and changes thereto can be made by persons skilled in the art without departing from the scope and spirit of the invention.

In order to use MEMS microphones in gas leak detector, industrial applications, the microphone is preferably packaged to meet the requirements for operation in a hazardous location as defined by governing agency bodies. One globally accepted method of protection for gas detectors is the explosion proof method (Ex d), which ensures that any explosive condition is contained within the enclosure, does not ignite the surrounding environment, and may utilize a flame arrestor as a protective element in front of the sensing element. The flame arrestor prevents the transmission of accidentally ignited flames or explosions, while permitting the flow of air and gas. Some of the standards that are widely accepted by the industry and government regulatory bodies for explosion-proof design are CSA C22.2 No. 30-M1986 from the Canadian Standards Association, FM 3600 and 3615 from Factory Mutual, and IEC 60079-0 and 60079-1 from the International Electrotechnical Commission.

Another method of protection is intrinsic safety (Ex ia), which is covered by IEC 60079-11 from the International Electrotechnical Commission. In the intrinsically safe method of protection an intrinsically safe electrical circuit is used with the sensing element; this barrier circuit limits the power to the sensing element such that no sparks can be generated leading to ignition of an explosive gas mixture.

In a practical implementation of a MEMS microphone or microphone array for industrial applications, the array may be placed behind an acoustically transmissive protective membrane such as detailed in U.S. Patent Application 2009/0060246 A1 along with either an explosion proof (Ex d) housing or an intrinsically safe (Ex ia) method of protection.

Figure 4:
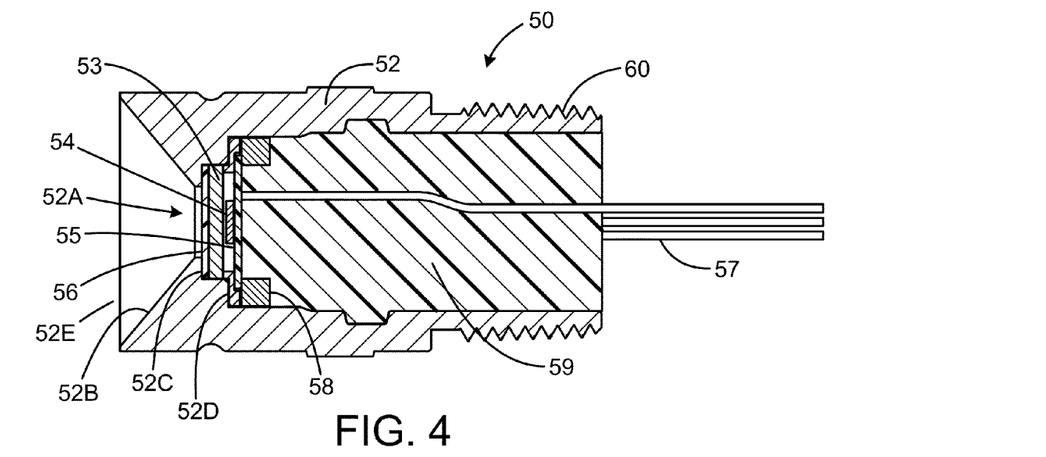
FIG. 4 depicts in cross-section an exemplary explosion proof housing structure and system for a gas leak detector system.

FIG. 4 illustrates an exemplary embodiment of an explosion proof acoustic system 50. This exemplary embodiment includes a housing 52, which in an exemplary embodiment may be fabricated from aluminum, stainless steel or other industrial metal with suitable tensile strength. The housing 52 in this example may take a generally cylindrically configuration, with a hollow open interior space. The external surface and the internal surface of the housing may be machined or fabricated with various shoulders and step surfaces, and the outer surface may include a threaded portion. For example, the system 50 depicted in FIG. 4 includes a housing 52 with a hollow interior space generally depicted as 52A. At the transducer end 52E of the housing, the hollow interior space is formed by a chamfer or lead-in 52B, and provides a port or window for acoustic energy to impact a transducer mounted in the housing. The interior hollow or open area 52A of the housing may be fabricated with support shoulder surfaces 52C and 52D, which may register the positions of particular elements of the system 50.

The exemplary system 50 includes a porous metal sintered disc 53, which in an exemplary embodiment may be made of type 316L stainless steel. The disc 53 is disposed on the front or transducer end 52E of the housing 52, registered in position by shoulder 52C, and acts as a flame arrestor. The sintered disc 53 can be press fitted into the housing, attached to the housing, or fabricated integral to the housing. This latter approach may be used if the sinter and housing material are both stainless steel. In an exemplary embodiment, the sintered metal disc 53 may be an eighth of an inch thick, with maximum pore size of 250 microns, which is known from the design guidelines and tests of governing agency bodies to meet the requirements for an Ex d protection method. An exemplary disc diameter is 1.0 inch. An array 54 of microphones is mounted on the front side of a circuit board 55 and placed close to but not in contact with the sintered metal disc; an exemplary spacing distance between the disc and the transducer is 0.015 inch.

The microphone array may alternatively be mounted on the rear side of the circuit board 55 if the MEMS microphone is of the type known as "bottom port" or "zero height"; in this case the ultrasound reaches the MEMS microphone through vias or holes in the circuit board. Knowles MEMS microphone SPU0410LR5H is an exemplary bottom port analog microphone that may be used. Knowles MEMS microphone SPH0641 LU4H is an exemplary bottom port digital microphone that may alternatively be used. FIG. 4C shows an alternate embodiment of an explosion proof acoustic system 50', in which the array 54' is mounted on the back side of the circuit board 55, away from the flame arrestor 53, and the ultrasonic energy passes through hole or opening 64 in the circuit board 55. The embodiment of FIG. 4C is otherwise similar to the embodiment of FIG. 4.

For operation of the system 50 in humid environments, a hydrophobic membrane 56 can be placed between the sintered disc 53 and the external environment. The membrane 56 may be selected for its excellent acoustic transmission properties; an example of such a membrane is Versapor 5000R manufactured by Pall Corporation of Port Washington, N.Y. Other membranes suitable for the purpose are manufactured by W.L. Gore & Associates, Inc. of Elkton, Md.

The porosity and thickness of the sintered metal disc is preferably selected such that the disc does not significantly degrade the transmission of acoustic sound waves of the desired frequency range to the microphone, e.g., ultrasonic frequencies. The sintered disc 53 thereby not only provides protection for operation in a hazardous environment, but also provides protection against dust and water while still permitting excellent acoustic sound wave transmission. The hydrophobic membrane 56 provides additional protection against the environment, if so desired. It also prevents dust and moisture from reaching the sintered metal disc 53, thereby preventing the porous metal disc from being clogged.

Still referring to FIG. 4 electrical wires 57 for bias, ground and signal lines for the acoustic transducer are routed off the circuit board 55 to the back of the housing. A typical bias voltage for a MEMS microphone is 2.5 V dc. A retainer 58 holds the assembly in place within the hollow region of the housing, while the remaining portion of the hollow region in the housing 52 is sealed off from the rear using an electrically insulating potting compound 59. An example of an agency compliant potting compound suitable for the purpose is Stycast 2850 FT from Emerson & Cuming.

In an exemplary embodiment, the acoustic system 50 with an explosion proof microphone array may provide a complete sensor for ultrasonic sound detection. With the encapsulated back end and the sintered metal disc front end, it is suited for operation in an explosive hazardous location as either an individual sensor that is mounted remotely, or a sensor that is attached to, e.g. by thread engagement, into another housing that is also adapted for hazardous locations. The threads 60 on the housing 52 of system 50 enable the sensor housing to be screwed into such a second housing. For example, FIG. 4A depicts the sensor 50 of FIG. 4 mounted into a housing 70 that contains the electronics to condition and process the sensor microphone array signals and subsequently generates outputs for the user.

Figure 4A:
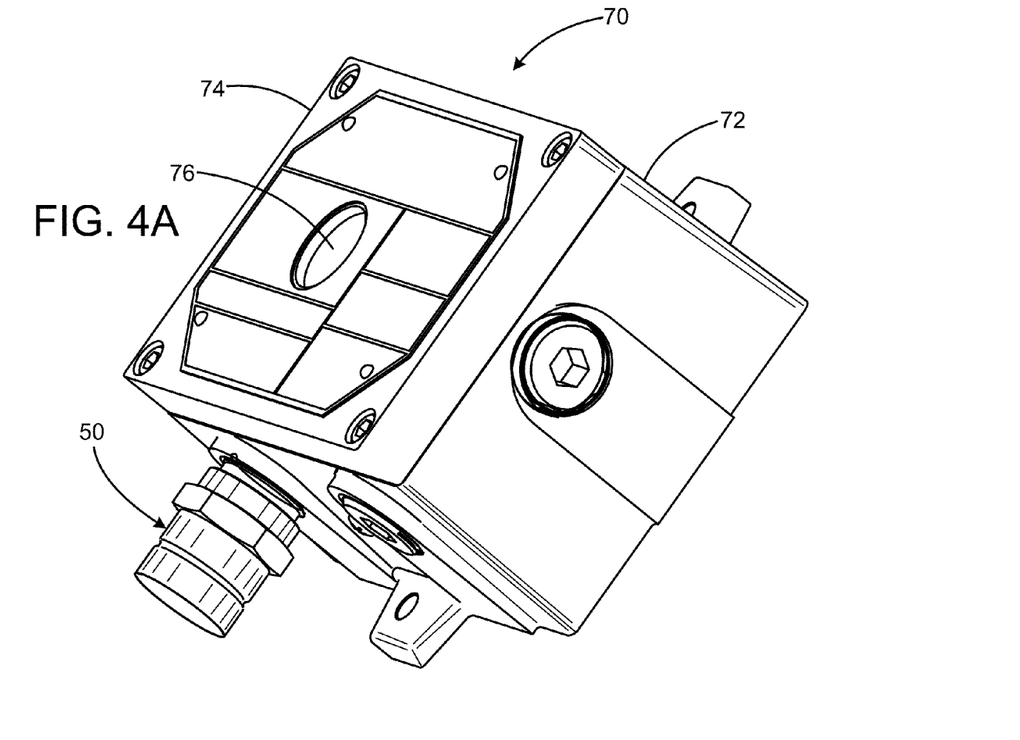
FIG. 4A illustrates an exemplary housing structure and system for receiving the system depicted in FIG. 4.

Referring to FIG. 4A, an ultrasonic array transducer system 50 is shown threaded into an enclosure 70 that also meets the requirements for operation in an explosive, hazardous environment. The acoustic system 50 may be, for example, the system 50 (FIG. 4). The acoustic system 50 in this application may omit the flame proof sealing structure 59 for some embodiments, in the case in which the enclosure 70 is itself explosion proof. The housing 70 in this exemplary embodiment includes a primary enclosure or bottom part 72 and a lid 74; the lid 74 is shown with an optical window 76 to view a displayed signal proportional to the acoustic sound pressure level. The bottom 72 of the enclosure has features to enable mounting of the enclosure on a suitable mounting bracket.

The second housing 70 may contain the electronics required to power the microphone, process the electrical signals generated by the microphone array, and provide outputs to the user to monitor and record the acoustic signal.

Figure 4B:
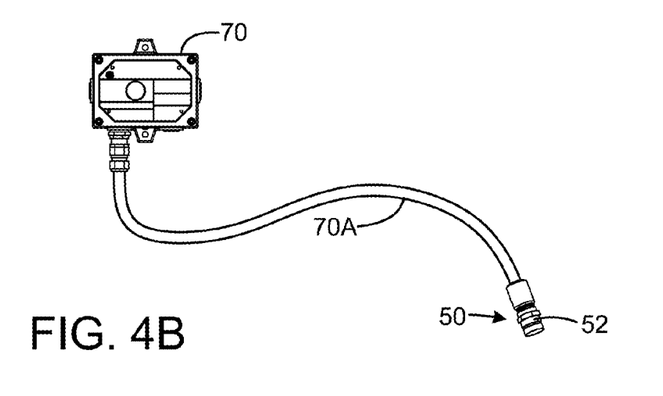
FIG. 4B illustrates another embodiment of a gas leak detector, with the sensing head remote from the main system housing.
Figure 4C:
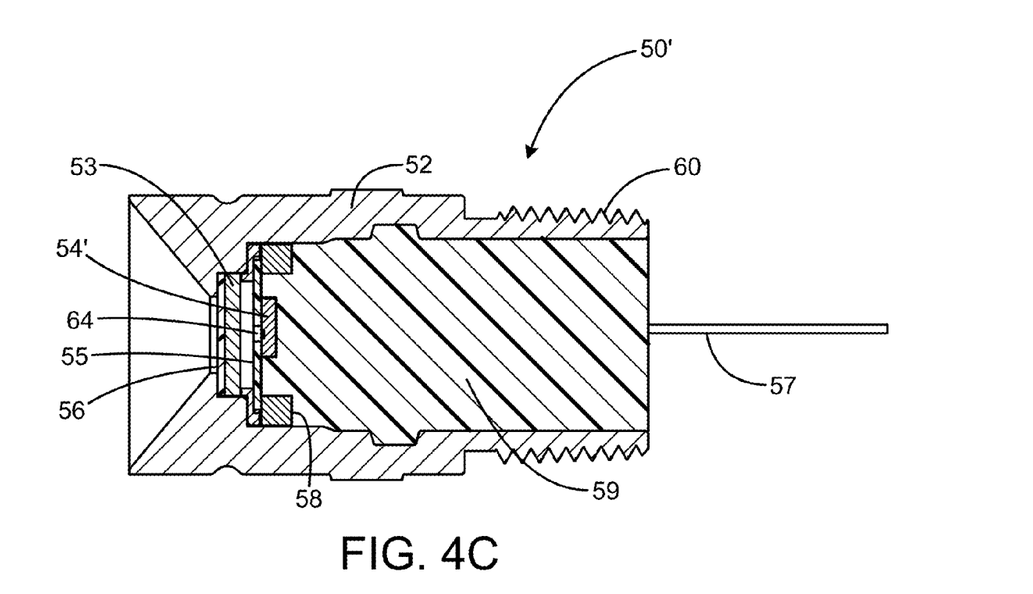
FIG. 4C illustrates a further embodiment of an acoustic detector system in an explosion proof housing structure.

Further, in other embodiments, the microphone array system 50 can be mounted remotely from the enclosure 70, and the connection between the remote housing and the enclosure may meet the requirements for operation in an explosive, hazardous environment. An exemplary embodiment of a remotely-mounted microphone array is illustrated in FIG. 4B. A communication link such as an electrical cable 70A in a conduit provides a signal connection between the microphone array 50 and the housing 70.

Figure 5:
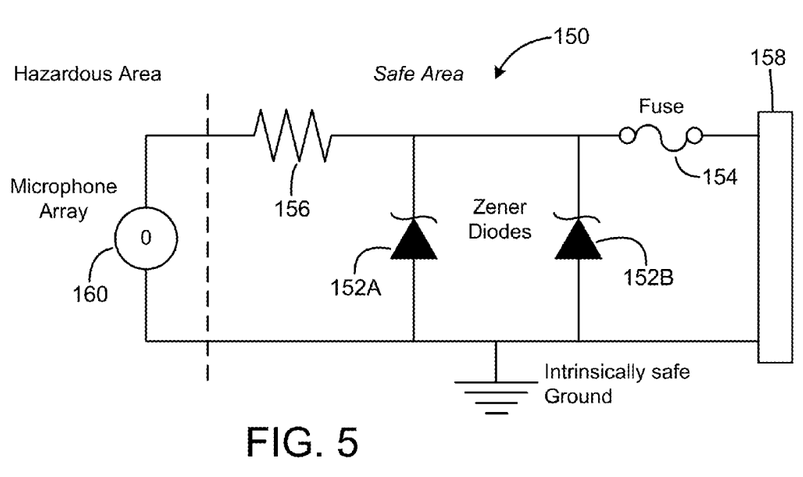
FIG. 5 is a simplified circuit schematic illustrating an intrinsically safe circuit for a microphone array as described above regarding FIGS. 1-3.

MEMS microphones are low power and low voltage devices typically operating at 2.5 V and drawing less than 1 mA current. Hence, MEMS microphones are well suited for intrinsically safe methods of protection. FIG. 5 shows an exemplary intrinsically safe circuit 150 connected between the MEMS microphone array 160 in the hazardous area and the power source 158. The circuit 150 utilizes a current limiting resistor 156, and Zener diodes 152A, 152B; two Zener diodes are used in this exemplary embodiment for redundancy. A Zener diode is a diode that allows current to flow in the forward direction in the same manner as an ideal diode, but also permits it to flow in the reverse direction when the voltage is above a specific well-defined value known as the breakdown voltage. If an unexpected high voltage is generated inside the instrument safe area the high reverse current through the Zener diode results in the fuse 154 being blown before electrical energy can be transmitted to the microphone array 160 located in the hazardous area.

Figure 6:
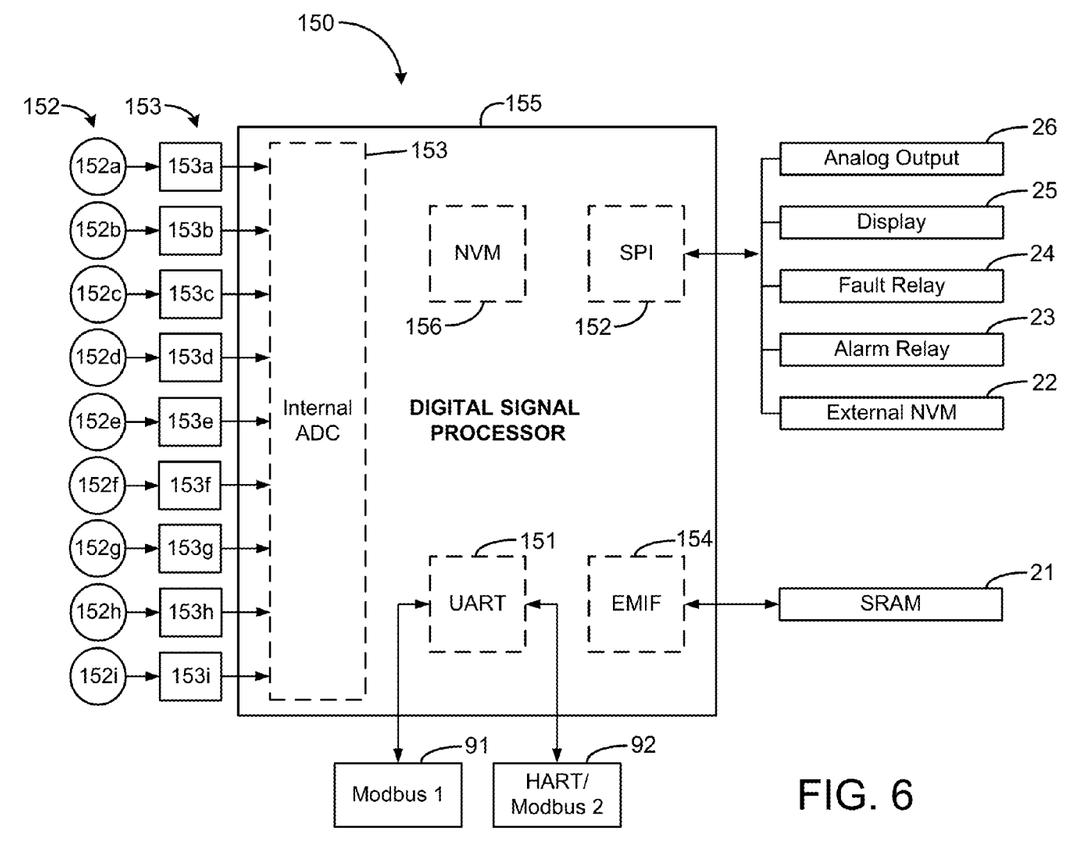
FIG. 6 is a schematic block diagram of features of the directional ultrasonic gas leak detector of FIGS. 1-3.

In an exemplary embodiment of a gas leak detector system 150 employing an array of MEMS microphones, shown in FIG. 6, outputs of nine MEMS microphones (152a through 152*i*) are signal conditioned (153*a* through 153*i*), then digitized 153 if the microphone outputs are analog, and further processed by the ultrasonic gas leak detector 150, which includes an electronic controller 155, e.g., a digital signal processor (DSP), an ASIC or a microcomputer or microprocessor based system. For the case where the microphones provide digitized outputs, the signal conditioning 153*a* through 153*i* includes analog-to-digital conversions, and the internal ADC 153 is not necessary. In an exemplary embodiment, the signal processor 155 may comprise a DSP, although other devices or logic circuits may alternatively be employed for other applications and embodiments. In an exemplary embodiment, the signal processor 155 also comprises a dual universal asynchronous receiver transmitter (UART) 151 as a serial communication interface (SCI), a serial peripheral interface (SPI) 152, an internal ADC 153 (if necessary), an external memory interface (EMIF) 154 for an external memory (SRAM) 21, and a non-volatile memory (NVM) 156 for on-chip data storage. Modbus 91 or HART 92 protocols may serve as interfaces for serial communication over UART 151. Both protocols are well-known in process industries, along with others such as PROFIbus, Fieldbus and CANbus, for interfacing field instrumentation to the user's computer or programmable logic controller (PLC). In an exemplary embodiment, the signal processor 155 is connected to a plurality of other interfaces through the SPI 152. These interfaces may include an external NVM 22, an alarm relay 23, a fault relay 24, a display 25, and an analog output 26.

In an exemplary embodiment, the analog output 26 may produce an indicative current level between 0 and 20 milliamps (mA), which can be used to trigger a remedial action, such as, by way of example only, shutting down process equipment pursuant to an established facility protocol. A first current level at the analog output 26, for example between 4 mA and 20 mA, may be indicative of a gas leak, a second current level at the analog output 26, for example 4 mA, may be indicative of normal operation, e.g., when no gas leak is present, and a third current level at the analog output 26, for example, 0 mA, may be indicative of a system fault, which could be caused by conditions such as electrical malfunction. In other embodiments, other current levels may be selected to represent various conditions.

In an exemplary embodiment, the signal processor 155 is programmed to perform signal pre-processing and artificial neural network (ANN) processing, as discussed more fully below. The signal processor 155 performs a beamforming function, as described more fully below. On detection of ultrasound from a gas leak the computed azimuthal and elevation angles of arrival ($\phi$, $\Theta$) of the ultrasound along with the sound pressure level (SPL) measured may be transmitted to the user via display 25, Modbus or HART (91 or 92). In a further exemplary embodiment, to be described more fully, this information may be used to superimpose the gas leak SPL and directional coordinates onto an image of the surveilled scene.

US 2014/0000347 details how an artificial neural network (ANN) may be used in an ultrasonic gas leak detector to discriminate ultrasound generated by pressurized gas leaks from nuisance ultrasound created by, for example, machinery or biological sources. The ANN may be used in conjunction with a sound pressure level (SPL) threshold (FIG. 2 of US2014/0000347 A1), or bypass the use of a SPL threshold (FIG. 5 of US2014/0000347 A1). In the present exemplary embodiment, where beamforming is used to determine the DOA of the received ultrasound, the teachings of US2014/0000347 A1 may be used to determine if the received ultrasound energy is emanating from a pressurized gas leak (a threat) or emanating from a nuisance source (a false alarm). The SPL measurement and ANN computation may be performed using signals from any of the MEMS microphones belonging to the two ULAs. In the instance where the DOA plots show a single source of ultrasound, the direction of the pressurized gas leak or nuisance ultrasound may be identified. Non-ANN based signal processing could also be used to discriminate the presence of gas leaks from nuisance ultrasound. Alternately, the ultrasonic gas leak detector may be a simple threshold device with no means to distinguish gas leak ultrasound from nuisance ultrasound. Beamforming using ULAs and DOA computation is thus independent of the gas leak discrimination capability of the ultrasonic gas leak detector. As mentioned earlier, an SPL threshold, for example 65 dB, may be used along with DOA information to decide on the need for user action: such thresholds eliminate the triggering of alarms for low levels of detected gas leak or nuisance ultrasound.

Figure 7:
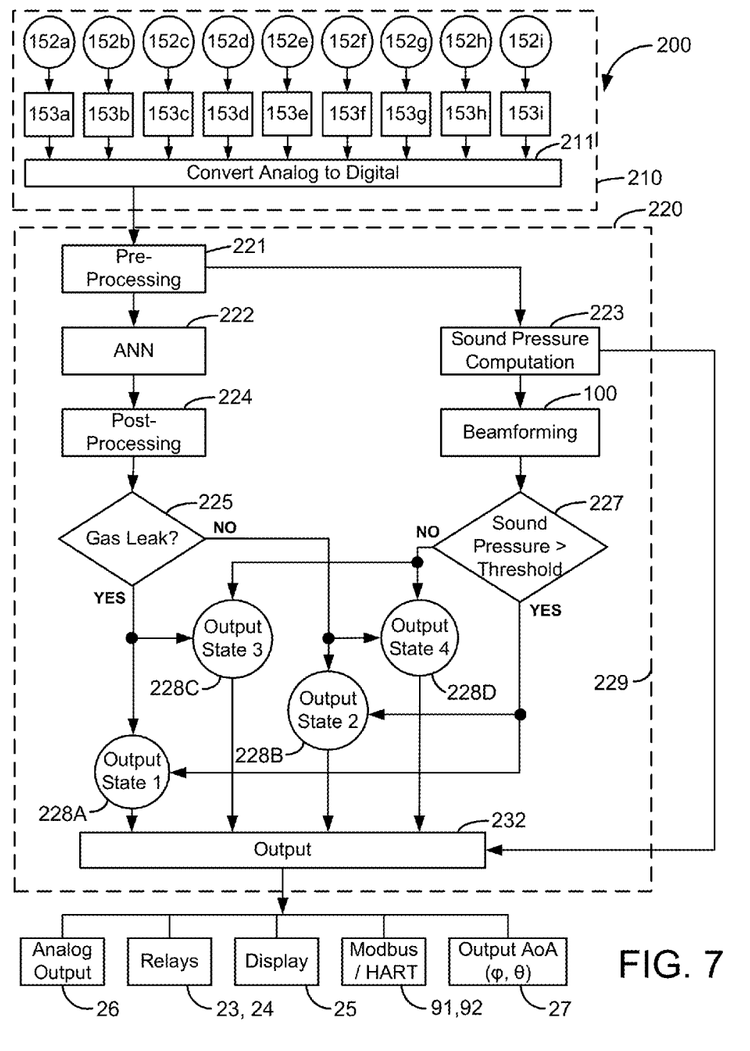
FIG. 7 is a functional block diagram of features of an embodiment of a directional ultrasonic gas leak detector employing an array of microphones.

FIG. 7 is an exemplary functional block diagram 200 of an exemplary directional ultrasonic gas detector which may be implemented by suitable programming of the digital signal processor 155 (FIG. 6). The outputs of nine analog (in this exemplary embodiment) MEMS microphones (152*a* through 152*i*) comprising, for example, the two perpendicular ULAs of FIG. 1 are signal conditioned (153*a* through 153*i*), then digitized 211, generally indicated as 210. Processing algorithms 220 are then applied to the sensor data, including signal pre-processing 221, ANN validation function 222, and post-processing 224, and sound pressure computation 223 as detailed in US Published Application US2014/0000347 A1. Beamforming 100 as described, for example, in the flowchart of FIG. 3 provides the angle of arrival and peak values of incident ultrasound. In an exemplary embodiment, the computed sound pressure level (SPL) 223 is compared against a preset threshold 227, while the post processed ANN provides a determination as to whether the microphone signal is generated by a real gas leak 225. In an exemplary embodiment, the combination of the decision blocks 225 and 227 result in four combinations:

Output state 228A for combination (1) Yes to Gas Leak & (2) Yes to SPL>threshold
Output state 228B for combination (1) No to Gas Leak & (2) Yes to SPL>threshold
Output state 228C for combination (1) Yes to Gas Leak & (2) No to SPL>threshold
Output state 228D for combination (1) No to Gas Leak & (2) No to SPL>threshold Output state 228A corresponds to the case of a real gas leak, one with ultrasound that exceeds the SPL threshold 227 and emanates from computed ($\phi$, $\Theta$) azimuth and elevation angles. The threshold value 227 may be considered a gas detection threshold; the user may choose to set a higher alarm threshold for alarm relay 23 in the output block 230. Output state 228B corresponds to the situation where the large measured SPL has been diagnosed as being caused not by a gas leak, but rather by a false alarm source located at the computed ($\phi$, $\Theta$) azimuth and elevation angles. Output state 228C corresponds to the detection of a real gas leak, but small enough in magnitude to produce an SPL less than the threshold 127. Output state 228C may be considered to be a minor leak, or to provide a warning to the user of an imminent larger leak. The user would typically not take corrective action but is advised to monitor the facility more closely. Output state 228D corresponds to the situation where nothing much is happening; there is no evidence of a gas leak, no peak in the beamforming plot, with the background SPL at a value considered insignificant. Output state 228D would be typical of a quiet industrial environment such as a remote onshore wellhead.

Figure 8:
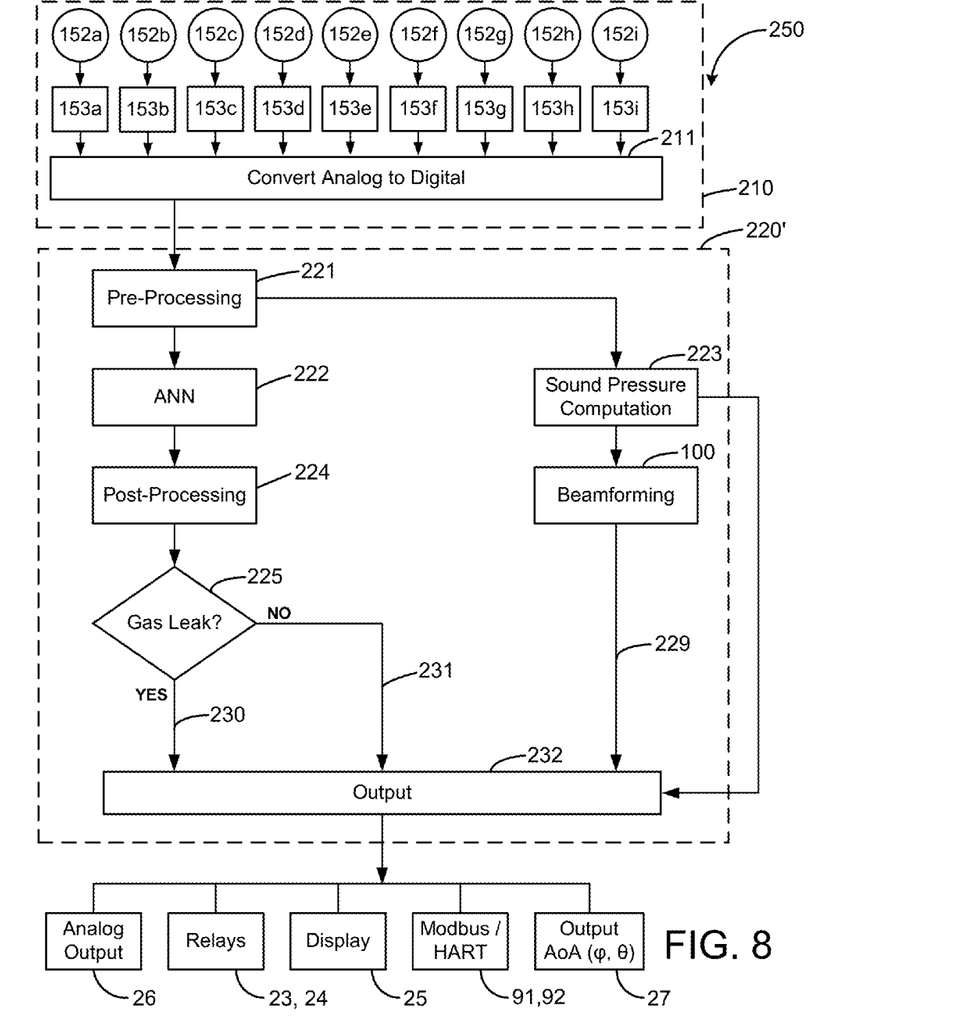
FIG. 8 is a functional block diagram of features of another embodiment of a directional ultrasonic gas leak detector.

Referring now to FIG. 8, features of another exemplary embodiment of an ultrasonic gas leak detector 250 are depicted, depicting a functional block diagram of the gas leak detector. This embodiment is similar to that described in FIG. 7. However, in this exemplary embodiment, the signal processor 155 is programmed to implement processing algorithms 220', in which the computed SPL from sound pressure computation 223 is not compared against a preset threshold as shown in block 227 of FIG. 7. Rather, the computed SPL 229 is sent directly to the output block 230. At the same time, the post processed ANN provides a determination via decision block 225 as to whether the ultrasound is generated by a real gas leak indicated by output state 232 or by a false alarm as shown by output state 231. The output block 230 then informs the user of the presence (from output state 232), AOA direction 27 ($\phi$, $\Theta$) and severity (SPL in dB) (from signal 229) of a real gas leak via the output functions of the alarm relay 23, display 25, analog output 26, and external communication interfaces such as Modbus 91 and HART 92. If the computed SPL is shown to be created by a false alarm via output state 231 from decision block 225, the output block 230 can similarly inform the user of the false alarm event and its severity (in dB) via display 25, analog output 26, and external communication interfaces such as Modbus 91 and HART 92; in the case of a false alarm event indicated by output state 231 the alarm relay 23 would, however, not be activated.

In an exemplary embodiment, the direction of the gas leak can be transmitted to the user via angular azimuthal and elevation ($\phi$, $\Theta$) angular coordinates referenced to the central axis of the sweeping cone of sound. The measured beamforming peak size and direction of the gas leak may also be communicated via a graphical illustration depicting the direction of the gas leak in the cone of sound, for example, via discrete LEDs or a dot-matrix display.

To better communicate in a visual, practical and quantitative manner the direction and size of the gas leak to the user, a more sophisticated embodiment could display the angle of arrival (AoA) (27 of FIG. 7 or FIG. 8) of the ultrasonic energy in the conical scan by overlaying the visual information on an image display with a coincident optical field of view. The user can thus see the actual location of the gas leak, along with SPL values, superimposed pictorially over the image of the equipment that is likely the source of the gas leak producing the intense ultrasonic energy detectable several meters away. Though depth or distance information is not provided by a single 2-dimensional planar microphone array, it will be rather evident from the image that the ultrasonic energy is emanating from the suspect equipment and not the air space in between. Such a visual image also has the advantage that a known friendly gas leak, such as pressurized air release for maintenance purposes, could be zoned out by the user. An increase in ultrasound noise generated by machinery could also be easily monitored while at the same time discriminating such ultrasonic nuisance from real gas leaks using techniques such as the ANN described earlier. Further benefits include the recording and playback of ultrasonically overlaid images of events that caused alarms (or false alarms) including highlighting of equipment malfunction, time evolution of the event, and security aspects of the industrial facility. Such ultrasonically overlaid images could be continuously monitored via a webcam or on an internal security camera network.

Implementation of ultrasonic energy overlay on a visible image for industrial applications in hazardous environments typically involves an array of low cost MEMS microphones, analog and digital electronics in an enclosure suitable for hazardous locations, and an industrial imager. Such ultrasonic imaging of real world gas leaks, both combustible and toxic, provides great benefits for fixed gas detection installations over conventional point and open path gas detectors as well as over infrared gas imaging solutions. Infrared gas cloud imaging cameras are expensive, their sensitivity varies greatly with the gas being monitored, and their performance depends greatly on the differential between the leaking gas cloud temperature and background temperature. For such reasons infrared gas cloud imaging cameras are not being readily adopted in industrial fixed gas detection installations though they are capable of long range gas cloud detection in the hundreds of meters.

The ultrasonic solution described above does not suffer from many of the drawbacks associated with infrared gas cloud imaging. The chief requirement for ultrasonic gas leak detection, localization and imaging is that the leaking gas be under pressure regardless of whether it is flammable, toxic, or inert, and that the gas leak be at a distance of at most tens of meters, typically less than 30 or 50 meters. Under such conditions, pressurized gas leaks of a large number of hydrocarbon gases, toxic gases and even inert gases such as helium can be easily detected using ultrasonic gas leak detectors. Highly flammable gases such as hydrogen that cannot be detected by optical or infrared means can be easily detected using ultrasonic gas leak detectors, while leak location information may be presented using beamforming arrays with the ultrasonic overlay on visible imaging solution described above.

Figure 9:
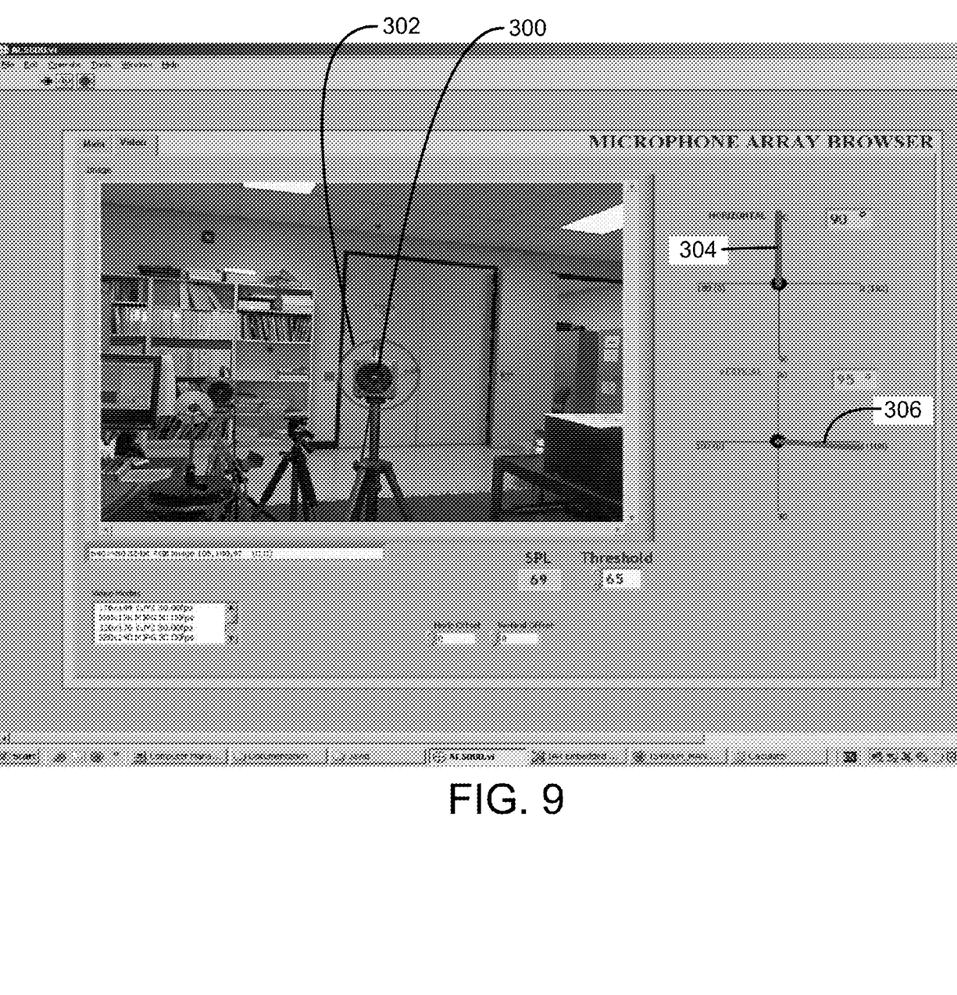
FIG. 9 is an exemplary embodiment of a laboratory ultrasonic source located using the 2-dimensional beamforming array of FIG. 1 and with the located laboratory ultrasonic source position overlaid on a visible image.

FIG. 9 depicts a screen snapshot of an acoustic source 300 generating ultrasound; the acoustic source is placed in the middle of a visible camera image displayed using LabVIEW from National Instruments. The circle 302 is the vector position of the sound source as calculated by the time-delay-and-sum beamformer 100 described above and overlaid on the visible image. If the acoustic source is moved to a different location, the circle will follow the acoustic source. The pointers 304,306 indicate the horizontal and vertical angular coordinates of the sound source. The horizontal direction is 90 degrees, and therefore on the MEMS microphone array axis. The vertical direction is 95 degrees, and therefore 5 degrees below the MEMS microphone array axis. The SPL measured is shown as 69 dB and is greater than the threshold set to 65 dB.

In a further embodiment, the magnitude of ultrasound measured by the beamformer for each scan angle direction could be overlaid over the corresponding visible image pixels providing a continuous ultrasonic map of the scene under observation. For an exemplary embodiment, for each of the 72 azimuth scan angle directions there are also 72 elevation scan angle directions resulting in a matrix of 72 by 72 scan angle directions with a beamformer calculated ultrasound magnitude for each of the 72 by 72 directions totaling, in this example, 5184 directions. These ultrasound magnitudes can be superimposed over the corresponding visible image pixel areas, for example, using a color coded scheme as is done for temperature measurements with thermal imagers. Alternatively, the ultrasound magnitudes in numerical form at each position could be displayed in overlay fashion onto the image of the scene under observation.

Figure 10:
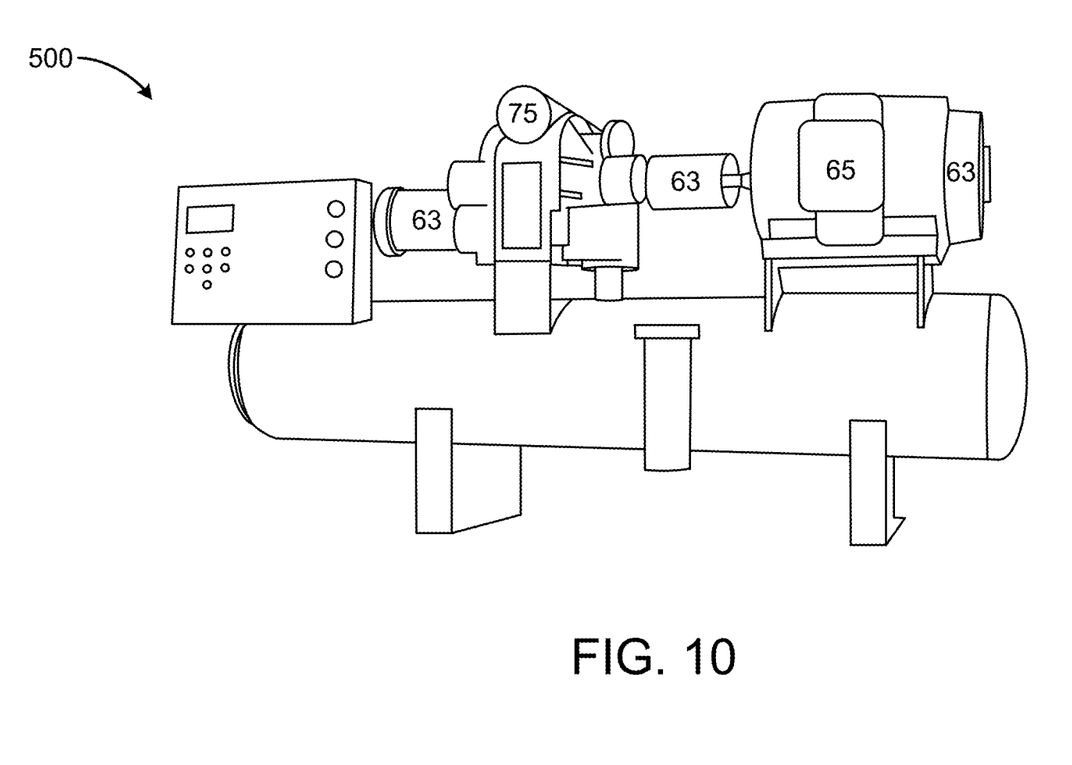
FIG. 10 diagrammatically depicts a display representing a surveilled scene, in which the directional ultrasonic detector has a field of view centered on an equipment.

FIG. 10 diagrammatically depicts a display representing a surveilled scene, in which the directional acoustic detector has a field of view centered on equipment 500, such as, for example, a compressor, in a hazardous location. The beamforming array generates signals indicative of the ultrasonic SPL generated by different parts of the equipment. Parts of the equipment in this example generate more intense ultrasonic SPL than others, resulting in local maxima or peaks as the beamformer continuously scans in the azimuth and elevation directions. FIG. 10 shows several peak magnitudes measured by the beamformer as it continuously scans in the azimuth and elevation directions. The computer SPL magnitudes are overlaid onto the image of the surveilled scene; in the exemplary embodiment of FIG. 10 only SPL values greater than or equal to a threshold of 63 dB are shown in the display. The continuously scanning beamforming array is thus able to monitor the compressor, and provide a record of the ultrasonic emissions from different parts of the compressor. Such information could be useful to maintenance and process personnel.

Although the foregoing has been a description and illustration of specific embodiments of the subject matter, various modifications and changes thereto can be made by persons skilled in the art without departing from the scope and spirit of the invention.

What is claimed is:

1. A directional ultrasonic gas leak detector, comprising:
   an electrical circuit, comprising an array of spaced MEMS microphones, each said microphone responsive to incident airborne ultrasonic energy from gas leaks sources disposed within range of the array to generate a microphone signal; and
   a beamforming processor responsive to the microphone signals from said array of MEMS microphones to generate processor output signals indicative of estimated angles of arrival of ultrasonic energy incident on the array from the gas leak sources within range of the array.

2. The detector of claim 1, wherein the array is a two dimensional array, and the microphones of the array are spaced uniformly and equally in two orthogonal directions to form at least two linear arrays.

3. The detector of claim 2, wherein the beamforming processor is configured to perform beamsteering processing independently for each of the first and second uniform linear arrays.

4. The detector of claim 2, wherein the microphones of the array are spaced from adjacent MEMS microphones in the array by a spacing distance no larger than 5 mm.

5. The detector of claim 1, wherein the processor is configured to indicate an estimated angle of arrival of said ultrasonic energy only when the sound pressure level of the incident ultrasonic energy exceeds a threshold value.

6. The detector of claim 1, further comprising:
   a display for displaying an image of a scene surveilled by the detector within said range, including equipment through which gas is passed or stored;
   the display responsive to the processor output signals to depict a location of a gas leak source superimposed on said image.

7. The detector of claim 6, wherein the display is further responsive to the processor output signals to depict an intensity of the gas leak source.

8. The detector of claim 1, wherein the processor output signals comprise signals representing angular azimuthal and elevation coordinates of a detected gas leak.

9. The detector of claim 1, wherein the beamforming processor is configured to perform time-delay-and-sum beamforming on the array signals.

10. The detector of claim 1, wherein the detector array is mounted to a circuit board, and the microphones cover an area no larger than about 10 square centimeters.

11. The detector of claim 1, wherein the port has an opening size no larger than about 10 square centimeters.

12. The detector of claim 1, further comprising:
    an explosion proof housing structure, the array and the processor disposed within the housing structure, the housing structure including a port through which incident ultrasonic energy passes from gas leak sources to the array.

13. The detector of claim 12, further comprising a flame arrestor structure covering the port of the housing structure.

14. The detector of claim 12, further comprising a hydrophobic membrane disposed in or covering the port.

15. The detector of claim 1, wherein the electrical circuit comprises a barrier circuit connected to the microphone array, the barrier circuit configured to limit power applied to the microphone array to prevent ignition of an explosive gas mixture.

16. The detector of claim 1, wherein the processor is responsive to the microphone signals from said array of MEMS microphones to process a plurality of beam directions, and to generate processor output signals indicative of an estimated angle of arrival of ultrasonic energy incident on the array at one of said beam directions generating the largest response.

17. The detector of claim 1, wherein said beamforming processor is responsive to broadband incident airborne ultrasonic energy from gas leak sources disposed within a range of 50 meters from the array, to generate the processor output signals.

18. A directional ultrasonic energy detector, comprising:
    a two-dimensional array of spaced MEMS microphones, each said microphone responsive to incident airborne ultrasonic energy from sources disposed within range of the array to generate a microphone signal;
    a processor responsive to the microphone signals from said array of MEMS microphones to process a plurality of beam directions, and to generate processor output signals indicative of an estimated magnitude of ultrasonic energy incident on the array from each said beam direction; and
    a display responsive to the processor output signals and for generating an image representative of a surveilled scene with the estimated magnitudes of incident energy at said beam directions overlaid onto the image.

19. The detector of claim 18, wherein the detector array is mounted to a circuit board, and the microphones cover an area no larger than about 10 square centimeters.

20. The detector of claim 18, further comprising an explosion proof housing structure, the array disposed within the housing structure, the housing structure including a port through which incident ultrasonic energy passes from the surveilled scene to the array.

21. The detector of claim 18, further comprising a barrier circuit connected to the microphone array, the barrier circuit configured to limit power applied to the microphone array to prevent ignition of an explosive gas mixture.

* * * * *